Sept. 13, 1927.

H. D. CAMPBELL

CLUTCH

Filed Dec. 22, 1925

Inventor:
Howard D. Campbell

By
Attorneys

Sept. 13, 1927.  
H. D. CAMPBELL  
CLUTCH  
Filed Dec. 22, 1925
1,642,298
2 Sheets-Sheet 2
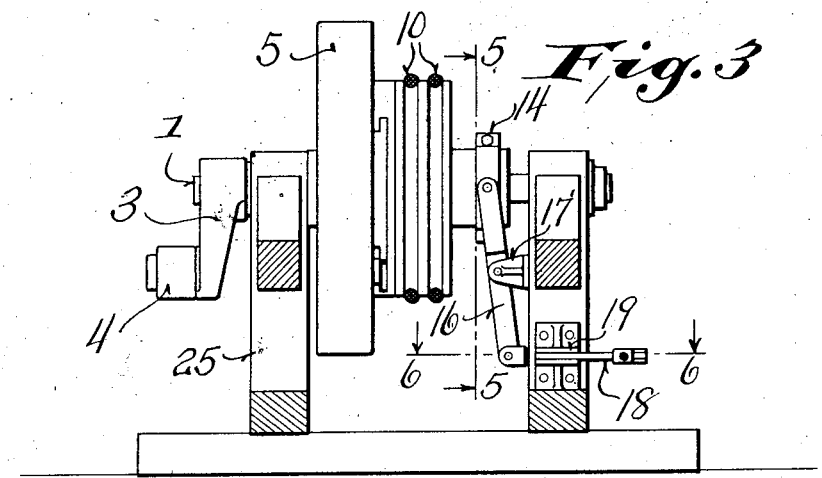
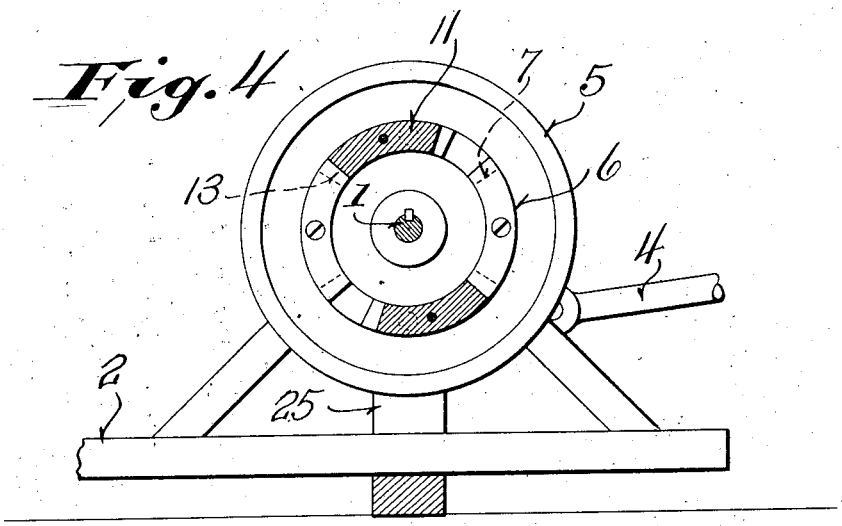
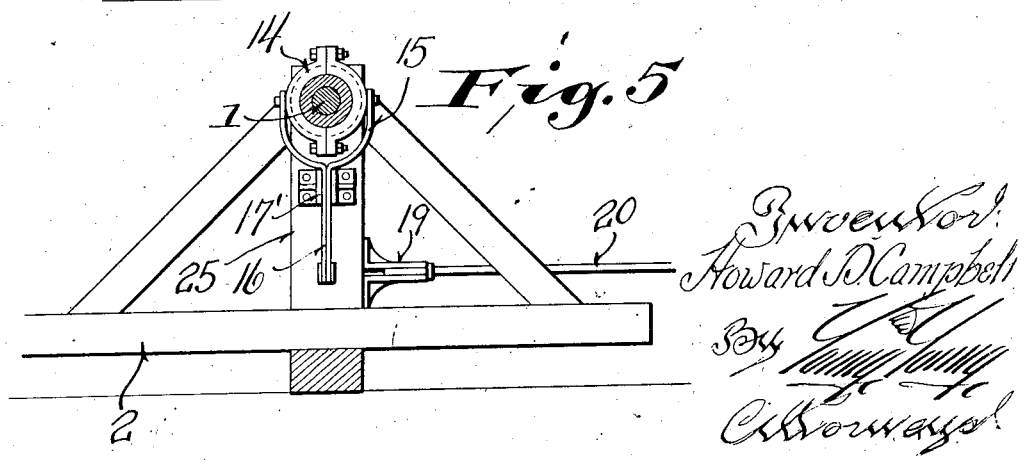
Inventor:
Howard D. Campbell Patented Sept. 13, 1927.

1,642,298

UNITED STATES PATENT OFFICE.

HOWARD D. CAMPBELL, OF McALESTER, OKLAHOMA, ASSIGNOR OF ONE-HALF TO C. R. HUDSON, OF McALESTER, OKLAHOMA.

CLUTCH.

Application filed December 22, 1925. Serial No. 76,995.

This invention relates to clutches and is particularly directed to a clutch adapted for use on machines for drilling oil wells although it is applicable to other uses.

In drilling oil wells, it is the usual practice to provide a main wheel or bull wheel which is rigidly attached to the driven shaft, and which, therefore, rotates under all conditions of operation of the device. Under the usual practice, what is known as a tug rim wheel, is bolted directly and permanently to the bull wheel.

The ropes for operating the drilling apparatus travel in grooves around the tug rim wheel while power for other purposes is taken off from the bull wheel. Whenever it is not desired to use the tug rim wheel, it has heretofore been necessary to force the rope out of the grooves and off the wheel with danger to the operator and to the apparatus.

This invention is designed to overcome the above noted defects, and objects of such invention are to provide a clutch which may be readily operated from a point somewhat remote from the apparatus, and which is adapted to connect or disconnect the bull wheel and the tug rim wheel.

Inasmuch as the engines employed in operating the drilling apparatus are reversible, it is a further object of this invention to provide a clutch which will lock positively irrespective of the direction of rotation of the engine.

An embodiment of the invention is shown in the accompanying drawings, in which:—

Figure 3 is a sectional view on the line 3—3 of Figure 1.

Figure 4 is a sectional view on the line 4—4 of Figure 2.

Figure 5 is a sectional view on the line 5—5 of Figure 3.

Figure 1:
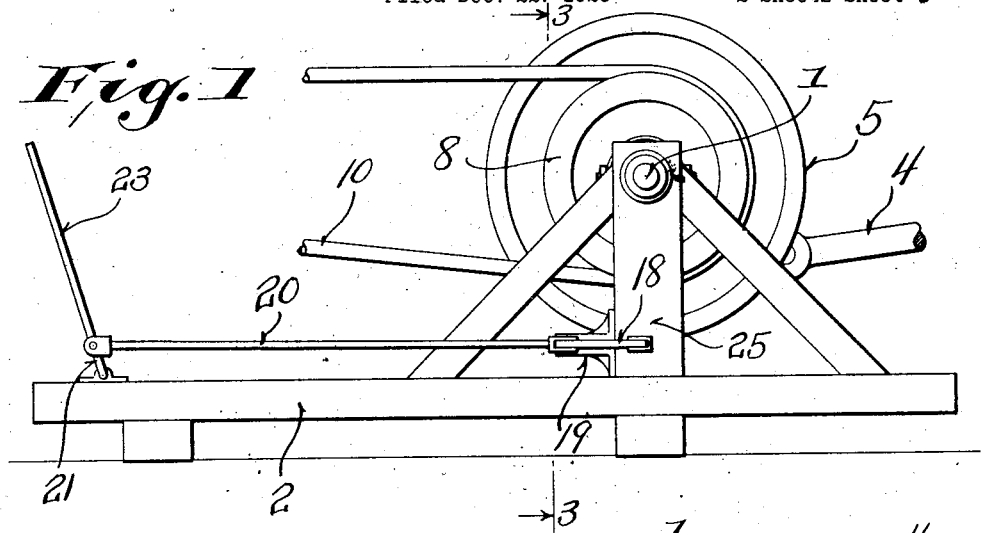
Figure 1 is a side elevation of the apparatus.

Referring to the drawings, it will be seen that a main shaft 1 has been illustrated as carried in suitable bearings upon the supports 2. This shaft is provided with a crank 3 operated by means of the connecting rod 4. A bull wheel 5 is rigidly attached to the shaft.

A metal ring 6 is secured to the bull wheel or main wheel 5 and is provided with spaced lugs, as indicated at 7.

Figure 2:
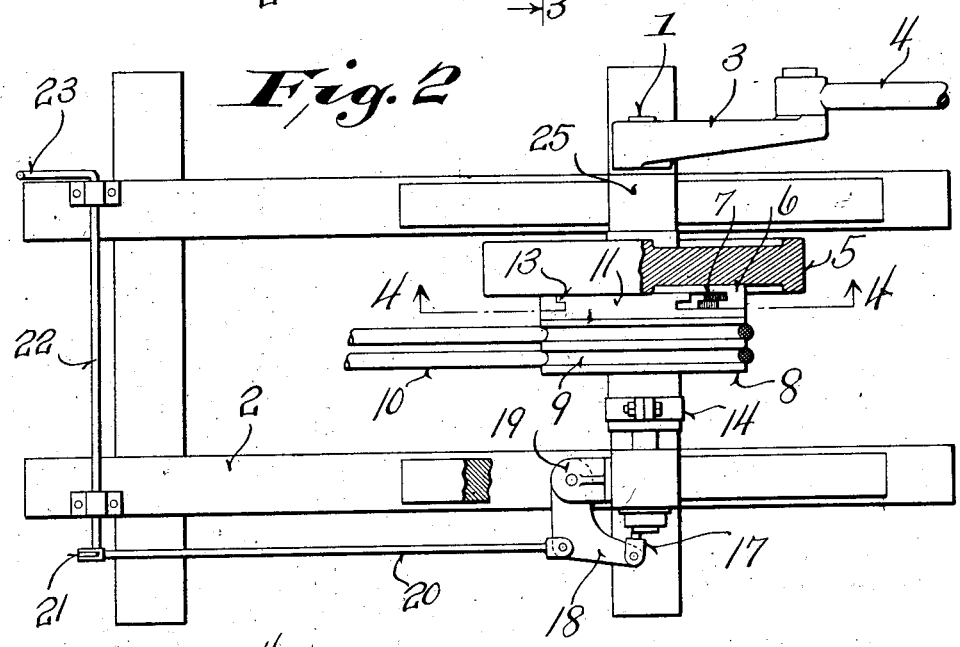
Figure 2 is a plan view thereof partly in section.

It is to be noted that the lugs on opposite sides of the spaces, as shown particularly in Figure 2, are turned inwardly towards each other.

The shaft 1 slidably carries a tug rim wheel or drum 8 which is provided with a plurality of grooves 9 over which the cables 10 run. This drum or tug rim wheel 8 is provided with projecting portions 11 adapted to fit into the spaces between the lugs 7 when the drum is slid into the position shown in Figure 2. These projecting portions are equipped with oppositely directed, outwardly extending lugs 13 which fit behind the lugs 7 of the ring 6 and thus positively interlock therewith. The double construction of lugs upon the ring 6 and the projections 11 is to provide for positive locking irrespective of the direction of rotation of the shaft 1.

It is to be noted further that the jaws which form the clutch do not merely abut against each other, but actually interlock due to the formation of the lugs 7 and 13.

It is to be noted further that the drum 8 is provided with a hub and a pair of strap-like members 14 surround such hub and fit into a groove therein, as illustrated in Figure 5.

The members 14 are positioned between the forked arms 15 of a lever 16, such lever being pivotally carried in the bracket 17'. The lower end of the lever 16 is connected by means of a pitman 17 with one arm of a bell crank lever 18. This bell crank lever is pivoted between the lugs 19, as shown in Figure 2, and has its other arm connected by means of a link 20 with a short arm 21 formed upon the rock shaft 22. The rock shaft is provided with an operating handle 23 at the end opposite the arm 21 so that it may be manually rocked to thus slide the drum or tug rim wheel 8 into and out of locking engagement with the bull wheel.

Figure 6:
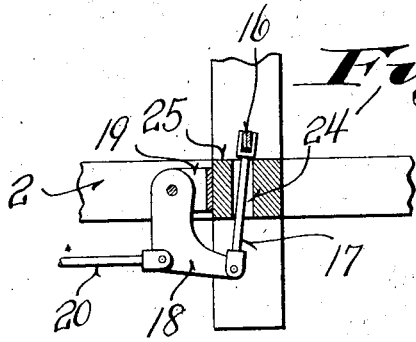
Figure 6 is a sectional view on the line 6—6 of Figure 3.

It is to be noted from Figure 6, particularly, that the link 17 extends through an aperture 24 formed in one of the vertical supports 25 for the main shaft bearings.

It will be seen that a novel form of clutch has been provided for positively locking the drum to the bull wheel irrespective of the direction of rotation of the shaft.

Further, it will be seen that the lugs 7 and 13 positively interlock and prevent inadvertent disengagement of the members of the clutch.

It will be seen further that the device is of simple construction and readily adapted to the control of drilling machines.

Although the invention has been described in considerable detail, it is to be understood that the invention may be variously embodied and the scope of the invention is to be determined as claimed.

I claim:

A clutch comprising a main shaft having a ring operatively supported therefrom, and provided with spaced inwardly projecting lugs paralleling the face of said ring, a second member slidably mounted upon said shaft and having projecting portions provided with outwardly projecting lugs adapted to interlock with said first mentioned lugs, whereby said slidable member may be driven in either direction upon reversal of rotation of said shaft, said inwardly projecting lugs being spaced apart a distance greater than the spacing of the outwardly projecting lugs, whereby said slidable member may be moved axially of the shaft to open the clutch.

In testimony that I claim the foregoing I have hereunto set my hand at McAlester, in the county of Pittsburg and State of Oklahoma.

HOWARD D. CAMPBELL.